United States Patent [19]

Chastan-Bagnis

[11] 4,008,156
[45] Feb. 15, 1977

[54] DEVICE FOR SUCKING THE UPPER LAYER OF A POLLUTED WATER SURFACE

[76] Inventor: Lucien Chastan-Bagnis, 21 Avenue Isola Bella, 06400 Cannes, France

[22] Filed: July 3, 1975

[21] Appl. No.: 592,904

[30] Foreign Application Priority Data

July 4, 1974 France .............................. 74.24592

[52] U.S. Cl. ..................... 210/242 R; 210/DIG. 25
[51] Int. Cl.² ........................................ E02B 15/04
[58] Field of Search ........ 210/83, 84, 242, DIG. 21

[56] References Cited

UNITED STATES PATENTS

| | | | |
|---|---|---|---|
| 3,578,171 | 5/1971 | Lisher | 210/242 |
| 3,664,505 | 5/1972 | Brittingham | 210/DIG. 25 |
| 3,688,506 | 9/1972 | Marcocchio | 210/242 |
| 3,715,034 | 2/1973 | Ivanoff | 210/DIG. 25 |
| 3,727,766 | 4/1973 | Horne | 210/242 |
| 3,737,040 | 6/1973 | Brydey et al. | 210/242 |
| 3,757,953 | 9/1973 | Sky-Eagle, Jr. | 210/242 |
| 3,760,944 | 9/1973 | Bell et al. | 210/242 |
| 3,789,988 | 2/1974 | Valiboyse et al. | 210/242 |
| 3,847,815 | 11/1974 | Chastan-Bagnis | 210/242 |
| 3,875,062 | 4/1965 | Rafael | 210/242 |
| 3,909,416 | 9/1975 | In't Veld | 210/242 |
| 3,915,864 | 10/1975 | Massei | 210/242 |
| 3,929,644 | 12/1975 | Fletcher | 210/242 |

Primary Examiner—Theodore A. Granger
Attorney, Agent, or Firm—Raymond A. Robic; Arthur Schwartz; Francis B. Francois

[57] ABSTRACT

Device for sucking the upper layer of polluted water surfaces by proceeding to a selection of polluted floating materials, characterized in that it comprises means adapted to maintain naturally separated polluting materials from water for conducting them into a stocking and collecting chamber before their evacuation.

3 Claims, 3 Drawing Figures

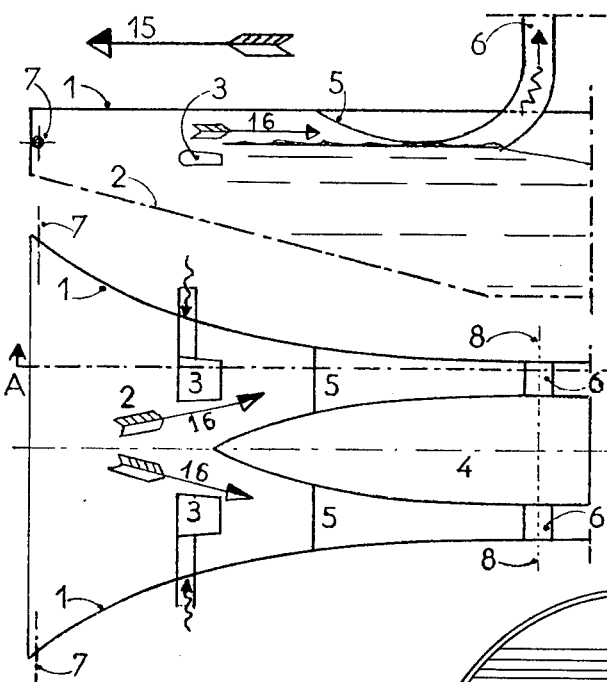
Fig. 1
Fig. 2
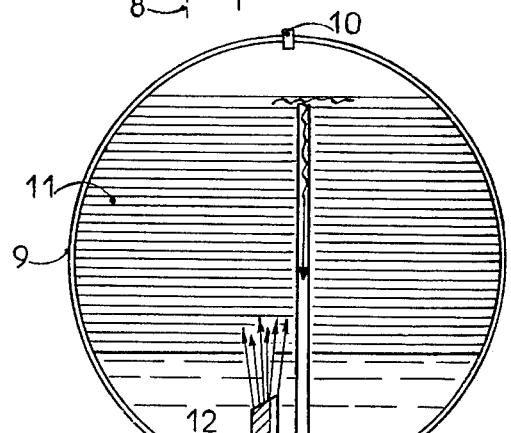
Fig. 3
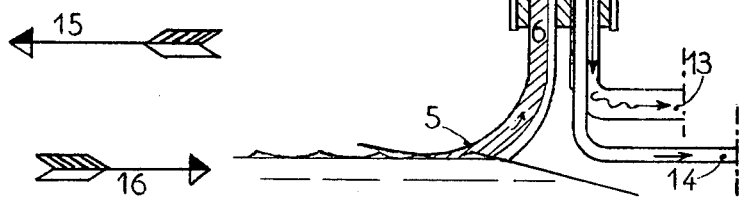

DEVICE FOR SUCKING THE UPPER LAYER OF A POLLUTED WATER SURFACE

The present invention relates to a device for sucking the upper layer of a polluted water surface by performing a selection of the floating polluted materials.

More particularly, the present invention relates to a device for selectively cleaning a polluted water surface from debris and non-miscible floating liquids.

The known devices used up to date for carrying out this operation are complicated, with limited efficiency and require very frequent adjustments.

The present invention overcomes the above drawbacks due to the fact that it operates without any manual intervention except for a supervision which is necessary in every installations for treating water.

The device of the present invention may be mounted on a self-propelled floating dock, in the front active collecting part thereof, but it may eventually be used alone in special cases for treating a moving sheet of water.

According to the present invention, the device for sucking the upper layer of polluted water surfaces by proceeding to a selection of polluted floating materials, is characterized in that it comprises means adapted to maintain naturally separated polluting materials from water for conducting them into a stocking and collecting chamber before their evacuation.

The device of the present invention comprises a collector in the form of a scoop provided with two vertical sides presenting a minimum loss to the admission of the polluted liquid stream. Between these two vertical sides and set back it is eventually possible to place one or more hollow bodies dividing the liquid stream by making it to pass into channels thus formed presenting a section called Venturi. In this zone the level of the polluted layer is substantially increased in the proportion of the flowing slowness. Above each of these particular zones there is a collecting trunk or aspirator having a mouth-piece the lips of which are in contact with the polluted layer. The trunk is also provided with a suction pipe which opens into a tight chamber wherein the polluted materials are stocked along with a certain quantity of water. This constant inflow in the chamber is made concurrently with a depression which is permanently maintained therein. In the suction pipe it is noted a classification of water and of non-miscible bodies, which in the chamber form two masses leveled according to the decreasing order of their specific gravity, i.e. from top to the bottom, water and afterwards the most frequently non-miscible hydrocarbons.

A second pipe at the lower part of the chamber evacuates the water which may be re-channelled into a treating apparatus at the upstream part of the water flow entering into the device. And, a conduit which opens into the chamber at the upper part of the layer non-miscible with the water permits the evacuation, by suction, of the polluted bodies. The different suctions are carried out by conventional means: turbines, pumps or aspirators.

From the above it is noted that there is produced a selective siphon effect.

The invention will now be described in a non-limitative manner with reference to the attached drawings wherein:

FIG. 1 is a cross section view along line A—A of FIG. 2;

FIG. 2 is a top view of the device according to the invention;

FIG. 3 is a cross section view, in a greater scale, of the polluted materials collecting and stocking chamber with its various pipes.

Referring now to the drawings, the collector of the device is shown to be composed of two vertical sides 1, and a bottom 2. Each of the sides 1 receives an output pipe, for the evacuation of the water, at the upstream part of a hollow ogive like body 4 which divides the stream of water into two equal portions which flow into two channels having decreasing sections from the front to the rear and in which the level of the polluted layer increases from the front to the rear. In this zone a mouthpiece 5 of a collecting trunk collects the polluted layer which is sucked. The entire body of the collector is linked at 7 for adjusting its action by varying a suspension the axis of which is shown at 8. This adjustment is automatically carried out by a conventional hydrostatic or electric system.

The FIG. 3 shows a collecting and stocking chamber 9 provided with a suction coupling 10 permitting the upward movement of the polluted mass, together with a little quantity of water, through a suction pipe 6 of the collecting trunk, in the pipe 6 it being noted a selection of two streams the most important of which is composed of polluted materials, the other being water. The floating materials are collected at 11 whereas the water remains at 12 at the bottom of the chamber 9 wherefrom it is permanently evacuated by a pipe 13. The polluted materials are sucked by the pipe 14.

In the drawings, the arrow 15 indicates the direction of movement of the self-propelled floating dock and the arrows 16 indicate the direction of the primary streams in the body of the collector.

The device of the present invention may be used in every cases where it is desired to clean a water surface from floating polluted materials. It may also be used in coastal zones as well as at high sea by small tonnage ships having great mobility. Particular application of the device may be made for the treatment of estuaries, mouths of rivers or the like and for all disposals.

I claim:

1. Apparatus for collecting floating polluting material from a body of water, comprising:
   supporting means having an inlet opening in the forward portion thereof;
   channel means in communication with said inlet opening, said channel means being defined by opposed vertically extending sidewalls constructed and arranged to be spaced apart a greater distance adjacent said inlet opening than at a location removed from said inlet opening, whereby as polluted water flows through said channel from said inlet opening toward the portion of said channel at said removed location the level of said polluted water is raised;
   a collecting chamber carried on said supporting means, adapted to separate the polluting material from the water according to their specific gravities;
   first conduit means connected at one end with said collecting chamber, the other end of said first conduit means having a mouthpiece thereon mounted to extend downwardly into said channel means at said removed location, to contact the raised, polluted upper level of water flowing through said channel at said removed location;

means connected with said collecting chamber operable for creating a negative pressure therein, whereby suction is placed on said first conduit means for drawing said polluted upper level of water into said collecting chamber;

second conduit means in communication at one end thereof with the region of said collecting chamber containing the separated polluting materials, and operable to effect the removal thereof from said chamber; and third conduit means in communication at one end thereof with the region of said collecting chamber containing the separated water, and operable to effect the removal thereof from said chamber.

2. Apparatus as recited in claim 1, wherein said collecting chamber includes sidewalls that are arranged to be substantially hyperbolic.

3. Apparatus as recited in claim 1, wherein said supporting means comprises a vessel constructed and arranged to move across said body of water, to thereby cause polluted water to flow through said channel.

* * * * *